United States Patent [19]
Carmichael et al.

[11] 3,955,453
[45] May 11, 1976

[54] CUTTING OF METALS BY SHEARING

[75] Inventors: Richard Quentin Carmichael, Cambridge; Roger George Bonelle, Burntwood, both of England

[73] Assignee: T.I. (Group Services) Limited, Birmingham, England

[22] Filed: June 13, 1974

[21] Appl. No.: 479,086

[30] Foreign Application Priority Data
June 13, 1973 United Kingdom............... 28116/73

[52] U.S. Cl.................................... 83/189; 83/188; 83/54; 83/542; 279/2 R; 225/103; 83/198
[51] Int. Cl.²....................................... B23D 21/14
[58] Field of Search ............ 83/180, 186, 189, 188, 83/190, 54, 542; 279/2; 225/103

[56] References Cited
UNITED STATES PATENTS

| | | | |
|---|---|---|---|
| 163,217 | 5/1875 | Lawson.................................. | 279/2 |
| 2,397,048 | 3/1946 | Roop .................................... | 83/189 |
| 2,856,997 | 10/1958 | Lafferty ............................... | 83/190 |
| 3,567,088 | 3/1971 | Andersen............................. | 83/54 X |

Primary Examiner—Donald R. Schran
Attorney, Agent, or Firm—Scrivener Parker Scrivener and Clarke

[57] ABSTRACT

In tube-shearing apparatus of the kind employing relatively transversely moving apertured dies and an internal supporting mandrel, the mandrel comprises an elastomeric body which is compressed axially with the high force to expand it radially against the tube wall such as to form not merely an internal support but effectively a supporting shear blade inside the tube. This allows clean shearing also of tubes having internal protuberances such as welding seams.

7 Claims, 6 Drawing Figures

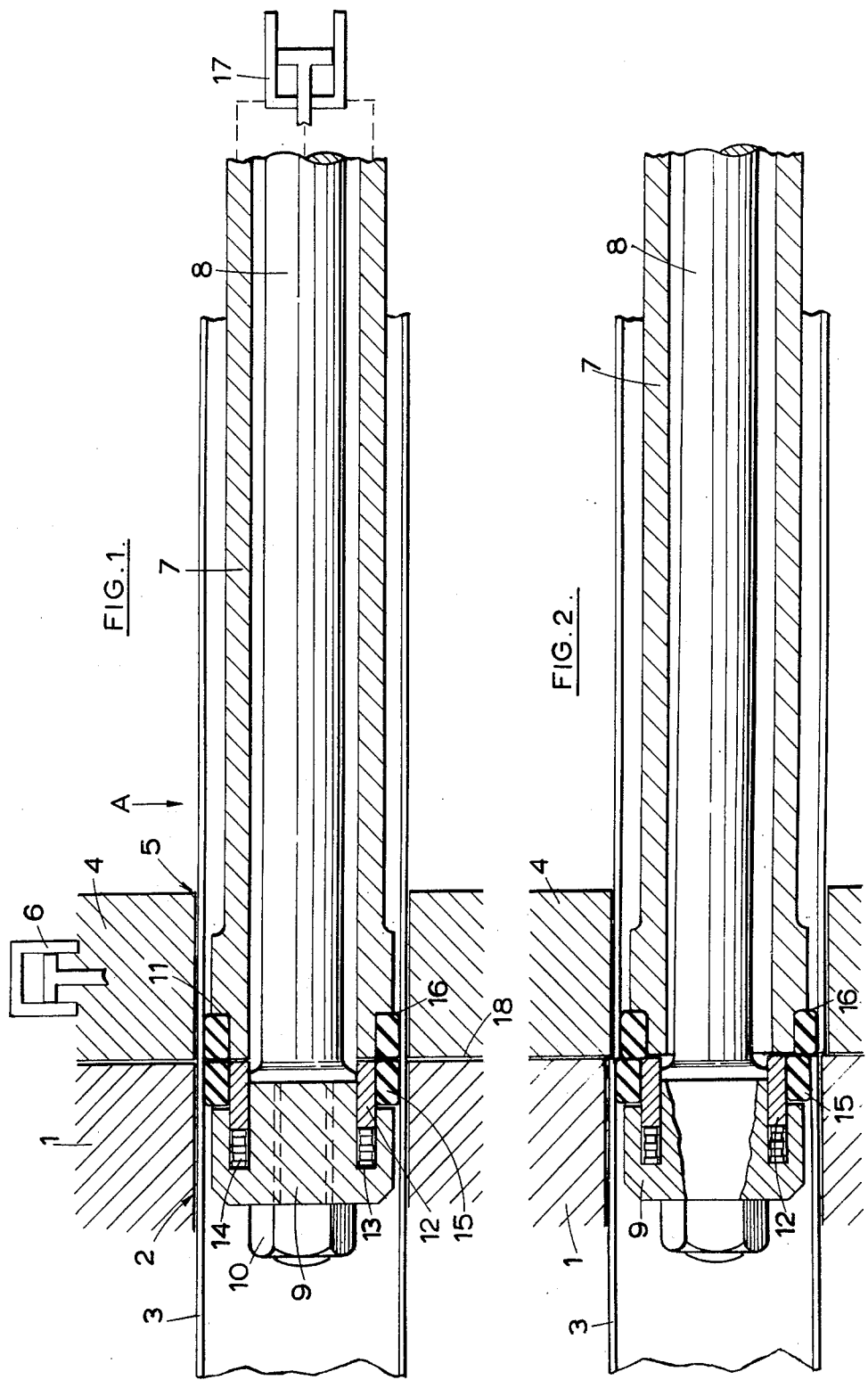

CUTTING OF METALS BY SHEARING

This invention relates to the cutting of tubes, primarily metal tubes, by shearing.

A well-known method of cutting off lengths of metal tubing is by a shearing action in a direction perpendicular to the length of the tube. For this purpose, and in order to prevent gross distortion, particularly in the case of thin-walled tube, it is usual to constrain the tube wall externally on both sides of the shearing plane by means of close-fitting dies. Relative displacement of the two parts of the die in a direction transverse to the axis of the tube causes the tube to be sheared. This action is similar to that in the shearing or cropping of solid bar, but if a tube is thought of as rolled-up flat sheet it will be clear that, for a true shearing action on the tube wall to be achieved, the second shearing edge must in fact be inside the tube.

It is known that this can be achieved by inserting in the bore of the tube a close-fitting mandrel which is split transversely at the shearing plane. The two parts are normally held together by spring loading and are arranged to be self-aligning. To obtain a good-quality cut and to avoid damage to the cutting edges, the mandrel has to be very accurately aligned with the shearing plane defined by the external dies. Moreover, to avoid distortion of the tube wall, it is also important that the mandrel should be a very close fit in the bore of the tube.

Clearly this method is difficult to apply if the average wall thickness of the tube is variable (even if the outside diameter or the inside diameter alone is kept within close tolerances) or if the tube wall includes local variations in thickness, such as that of the welding seam on the inside of a seam-welded tube, or of the fold line where the tube is formed by a linear or helical seaming or crimping process.

We are aware that it has been proposed to avoid the use of a mandrel by supporting a tube internally, during a shearing operation, by the use of a liquid, trapped or pressurised between plugs inserted in the tube on opposite sides of the shearing plane. This has the obvious drawback that the support vanishes as soon as the tube wall is first penetrated by the tools. There are also practical drawbacks such as the problem of forming and maintaining the seal afresh every time a cut is made, the considerable inconvenience of a liquid under pressure spurting out under pressure as soon as the tube wall is first penetrated by the tools and the fact that access to both ends of the tube is required.

The aim of the present invention is to provide improved means for shearing tube which overcomes the shortcomings of the split solid mandrel yet which avoids the drawbacks of other known mandrels or mandrel substitutes.

According to the invention, apparatus for shearing a tubular workpiece and comprising a pair of apertured dies through which the workpiece passes, one of the dies being movable relative to the other in a direction transverse to the axis of the workpiece to cause the shearing action, and a mandrel being provided for supporting the inside of the workpiece in the shearing plane, is distinguished by the feature that the mandrel includes at least one deformable elastomeric body in the shearing plane and means for compressing that body axially to cause it to expand radially and press against the inside of the workpiece so as effectively to form a shear blade within the workpiece, co-operating with the blades.

The loading of the elastomeric body should be such as to apply a load to the tube wall that the hoop stress exceeds the yield stress of the material of the tube and may even be chosen to exceed the bursting stress of the tube. In this way the body forms effectively a shear blade, co-operating with the blade formed on the moving external die.

We are aware that various proposals have been made for mandrels or plugs of rubber which is compressed axially to expand and grip the internal wall of a tubular body for purposes of clamping or location while some other operation is being performed on the body, or to effect a fluid seal, but this is not to be compared with actual co-operation in a shearing action.

We are also aware that bodies of rubber, compressed axially, have been used to bulge a tube wall outwards at selected regions, for example to form convoluted tube but here, in contrast to our own proposal, it is the mobile properties of the elastomer rather than its static properties that are being employed.

It will be appreciated that the elastomer will allow for substantial variations in the internal size and shape of the workpiece. The apertured dies between which the relative movement takes place may be of known form, and are preferably both of one-piece form, one being fixed and the other being movable linearly in a direction transverse to the length of the workpiece, for example by hydraulic or pneumatic means. However the invention is also applicable where the relative movement between the dies is an orbital one and also where the one or each of the dies is split in a diametral plane to facilitate insertion and removal of the workpiece.

The total relative displacement between the dies will normally be comparable with, or even less that, the wall thickness of the tube, as in known tube shears.

The invention will now be further described by way of example with reference to the accompanying drawings in which:

FIG. 1 is a section through apparatus for carrying out the method according to the invention, with a tube in position and about to be sheared;

FIG. 2 shows the apparatus after shearing has taken place;

Figure 3:
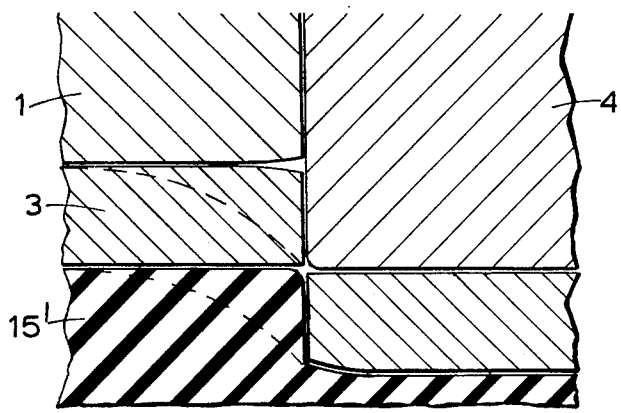
FIG. 3 illustrates diagrammatically the behaviour of the elastomer during the shearing action.

The shearing apparatus of FIGS. 1 and 2 comprise a fixed die 1 with an opening 2 in it just large enough to receive the largest tube 3 within the tolerance range in the tube to be sheared, and a movable die 4 having a similar opening 5. Each die may be in two halves, split in a plane containing the axis of the openings, so that the dies can be opened up to allow the tube to be laid in them; instead they may each be in one piece, in which case the tube is inserted axially.

Means for displacing the movable die perpendicular to the axis of the tube, i.e. in the direction of the arrow A are indicated diagrammatically at 6 and can take any known form such as a hydraulic or pneumatic ram or a mechanically driven eccentric. As in a normal shear the stroke should be comparable with the wall thickness of the tube for which the apparatus is designed.

A mandrel to support the inside of the tube during this shearing action comprises a hollow sleeve 7 and a central rod 8 having on its free end a head 9 secured by a nut 10. The outside diameters of the head 9 and the sleeve 7 are equal and of a value such as to provide clearance for a tube having the minimum internal diameter to be expected, including any welding seams or folds. At that end of it which is adjacent to the head 9, the sleeve 7 has a reduced portion defined by a shoulder 11. A ring 12 of plain rectangular cross-section is slidable in an annular recess 13 in the rear face of the head 9 and is urged to the right, as viewed in the drawings, by a spring 14 so that the ring 12 bears against the end face of the sleeve 7. The outside diameter of the ring 12 is equal to that of the reduced portion of the sleeve 7. The purpose of the ring 12, backed by the spring 14 is to permit axial movement of the head 9 without allowing a gap to appear at the shearing plane, shown at 18.

The resulting annular space between the head 9 and the sleeve 7 is occupied by a pair of rings 15 and 16 os elastomeric material, such as polyurethane, which is deformable but substantially incompressible. The invention can be perfectly satisfactorily performed with the rings 15 and 16 replaced by a single ring of double the width, as will be apparent from the explanation below with reference to FIG. 3, but the use of two rings is preferred since no flow of the elastomer is then required during the shearing action, thus permitting the use of a harder grade of elastomer and lower pressures, and thereby prolonging the life of the elastomer.

The head 9 and sleeve 7 are movable axially towards one another by means of a hydraulic cylinder indicated diagrammatically at 17, which puts the rod 8 under tension and the sleeve 7 under compression without causing any residual axial load on parts external to the mandrel. The resultant axial compression of the rings 15 and 16 causes those rings to expand radially and press tightly against the inside of the tubular workpiece 3 to be sheared, regardless of variations (within limits) of the internal diameter of the tube and regardless of welding seams or other small protuberances. The material of the rings is hard enough to prevent it being extruded through the small annular gaps between the tube and either the head 9 or the sleeve 7, and the ring 12 serves to prevent the rubber being extruded radially inwards.

It will be noted that the rod 8 has a substantial clearance within the sleeve 7 to allow the relative displacement that occurs between the head 9 and the sleeve 7 during shearing, as shown in FIG. 2.

After shearing, the movable die 4 returns to its rest position and the hydraulic cylinder 17 is de-energised, allowing the rings 15 and 16 to relax and allowing the cut portions of the tube to be removed. The whole mandrel assembly comprising the mandrel and the cylinder 17 may be displaced axially to the right as viewed in the drawings, to facilitate this.

It will be noted that access is required to only one end of the tube, by virtue of the fact that the compression of the elastomeric body is achieved by a tension rod passing through it. As indicated above, this also has the advantage that the high axial stresses are self-contained within the mandrel assembly and require no heavy external thrust-taking components.

The load applied by the elastomeric material should be very high, in fact at least high enough for the hoop stress to exceed the yield point of the material of the tube. FIG. 3 indicates diagrammatically the behaviour of the elastomer during the shearing action (in this case a single ring 15' is indicated instead of the two rings) and it will be appreciated that at this level of stress the tube wall is inevitably held under all conditions tightly against each of the external dies regardless of the relative movement of those dies, and is necessarily sheared by that relative movement, just as if the body 15' were two solid metal shear blades meeting at the shearing plane and co-operating with the external shear blades formed by the dies 1 and 4. Shown in broken lines is the path of tube wall would follow in the absence of the body 15'.

FIG. 3 also shows that, by splitting the body 15' into two bodies 15 and 16 we reduce the actual flow required of the elastomeric material during shearing, thereby prolonging its life and possibly reducing the loading that is needed, but without altering the fundamental behaviour.

Regardless of whether one ring 15' or two rings 15 and 16 are used, the axial location of the elastomeric body in relation to the shearing plane 18 is not critical, as in the known solid split mandrel. Also of course we achieve the main aim of the invention which is to allow a clean cut to be obtained even with tubes of uneven or indeterminate inside diameter.

It should be understood that, whilst we have described the invention with reference to tubes of round cross-section, it is applicable equally well to tubes of square, rectangular, oval or any other cross-section within reason.

Where (as is generally inevitable) the tubes on which the invention is used have outside diameters that vary within the limits of tolerance, the invention has the advantage that the pressure applied by the elastomer will expand the end of an undersize tube out to the diameter of the apertures in the dies 1 and 4, so effectively achieving a sizing operation and ensuring that, after the cutting operation, at least the ends of the tube are known to be of an exact size. This can be useful in many subsequent operations.

Figure 4:
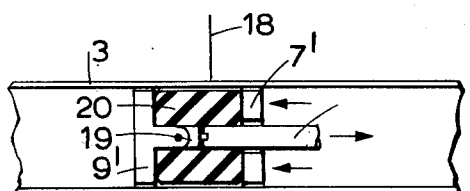
FIGS. 4 and 5 illustrate diagrammatically some modification.
Figure 5:
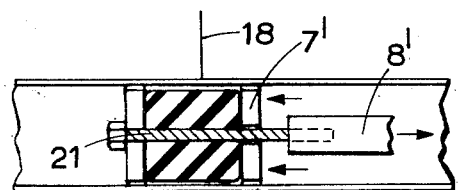

The arrangement shown in FIGS. 1 and 2 requires that the sleeve 7 and rod 8 are long enough to allow the required lateral deflection that occurs during shearing without bending the rod 8 beyond its elastic limit or alternatively the rod 8 may incorporate a flexible portion or hinge. FIGS. 4 and 5 show arrangements which avoid this restriction. In FIG. 4 the rod, shown at 8', is a tight fit in a ring 7' that corresponds to the operative end of the sleeve 7, and contains some form of universal joint 19 actually within the length of the elastomeric body shown at 20, to allow for the lateral deflection of the head 9'. In the version shown in FIG. 5 a similar result is obtained by the use of stranded cable 21 in place of at least that part of the rod that passes through the elastomeric body. In each case the actuating cylinder 17 (not shown) could be mounted immediately next to the member 7', making the overall mandrel assembly very compact, if desired.

Figure 6:
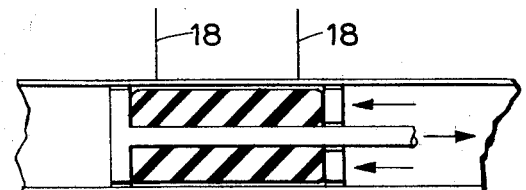
FIG. 6 illustrates a further modification.

In another modification, shown in FIG. 6, the invention is used to perform two shearing operations simultaneously at axially spaced points. A single elastomeric body, or a combination of mutually adjacent bodies, spans both shearing planes. This arrangement is useful where short rings are to be cut from a tube as, if the axial feed is arranged correctly, it means that two rings are formed at each shearing operation. Also it overcomes the problem of relative lateral shift of the different parts of the mandrel as there is no shift between the rigid parts, all the deflection being taken by the elastomeric body.

What we claim is:

1. In apparatus for shearing a tubular workpiece in a plane transverse to its axis, and including a pair of apertured dies through which the workpiece passes, one of the dies being movable relative to the other in a direction transverse to the axis of the workpiece to cause the shearing action and a mandrel including a radially expansible component for supporting the inside of the workpiece in the shearing plane wherein said radially expansible component comprises at least one deformable elastomeric body in the shearing plane and means for compressing that body axially to cause it to expand radially and press against the inside of the workpiece so as effectively to form a shear blade within the workpiece which cooperates with the dies during shearing action.

2. Apparatus according to claim 1 in which the elastomeric body is annular, first and second rigid bodies engaging the opposite sides of said annular elastomeric body, and a tension member passing through said annular body and operable in tension on said rigid bodies to cause the same to move relative to each other and axially compress the elastomeric body.

3. Apparatus according to claim 1 in which the mandrel comprises a sleeve with a rod passing through it and carrying a head of substantially the same diameter as the sleeve, the elastomeric body being a deformable ring mounted between the head and the end of the sleeve, and means for causing relative axial movement between the rod and the sleeve to squeeze the ring.

4. Apparatus according to claim 3 in which the sleeve has a reduced portion on that end of it which is adjacent to the head and the head includes an axially slidable ring, axially spring-urged into contact with the reduced end of the sleeve, and in which the deformable ring fits around the slidable ring and the reduced end of the sleeve.

5. Apparatus according to claim 4 in which the end face of the reduced end of the sleeve coincides with the shearing plane.

6. Apparatus according to claim 2 in which the tension member passing through the elastomeric body is flexible.

7. Apparatus according to claim 1 in which the dies incorporate two axially spaced shearing planes and in which the elastomeric body spans across both shearing planes.

* * * * *